United States Patent
Chand et al.

(10) Patent No.: US 7,526,794 B2
(45) Date of Patent: Apr. 28, 2009

(54) DATA PERSPECTIVES IN CONTROLLER SYSTEM AND PRODUCTION MANAGEMENT SYSTEMS

(75) Inventors: Sujeet Chand, Brookfield, WI (US); Stephen C. Briant, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 557 days.

(21) Appl. No.: 11/241,411

(22) Filed: Sep. 30, 2005

(65) Prior Publication Data

US 2007/0079355 A1  Apr. 5, 2007

(51) Int. Cl.
G06F 17/30 (2006.01)
G06F 19/00 (2006.01)

(52) U.S. Cl. ............................... 726/2; 706/1; 700/108
(58) Field of Classification Search ...................... 726/2
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,301,320 A | 4/1994 | McAtee et al. |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |

(Continued)

OTHER PUBLICATIONS

Vladimir et al, "Rockwell Automation Agents for Manufacturing", Jul. 2005, ACM, pp. 107-113.*

(Continued)

*Primary Examiner*—Matthew B Smithers
(74) *Attorney, Agent, or Firm*—Amin Turocy & Calvin LLP; William R. Walbrun

(57) ABSTRACT

A programmable logic controller is disclosed that filters and presents to a user data that conforms to a hierarchically structured data model. The programmable logic controller through utilization of an input component that receives data and a filter component that filters the data based at least in part on one or more filtering criteria is able to extract data that is relevant to an individual user's needs and/or requirements. The filtering criteria utilized by the filtering component can include passwords and group affiliations as well as the user's biometric and/or anthropometric information. The claimed subject matter further relates to a component that can be utilized to provide a similar filtering functionality with respect to legacy programmable logical controllers, and legacy industrial automation devices.

37 Claims, 9 Drawing Sheets

U.S. PATENT DOCUMENTS

| | | | |
|---|---|---|---|
| 5,644,740 A | 7/1997 | Kiuchi | |
| 5,675,748 A | 10/1997 | Ross | |
| 5,715,413 A | 2/1998 | Ishai et al. | |
| 5,721,905 A | 2/1998 | Elixmann et al. | |
| 5,761,499 A | 6/1998 | Sondregger | |
| 5,797,137 A | 8/1998 | Golshani et al. | |
| 5,812,773 A | 9/1998 | Norin | |
| 5,828,851 A | 10/1998 | Nixon et al. | |
| 5,832,486 A | 11/1998 | Itoh et al. | |
| 5,838,563 A | 11/1998 | Dove et al. | |
| 5,848,273 A | 12/1998 | Fontana et al. | |
| 5,862,052 A | 1/1999 | Nixon et al. | |
| 5,884,025 A | 3/1999 | Baehr et al. | |
| 5,884,033 A | 3/1999 | Duvall et al. | |
| 5,913,029 A | 6/1999 | Shostak | |
| 5,924,094 A | 7/1999 | Sutter | |
| 5,936,539 A | 8/1999 | Fuchs | |
| 5,940,294 A | 8/1999 | Dove | |
| 5,940,854 A | 8/1999 | Green, Jr. et al. | |
| 5,951,440 A | 9/1999 | Reichlinger | |
| 5,960,420 A | 9/1999 | Leymann et al. | |
| 5,966,705 A | 10/1999 | Koneru | |
| 5,978,577 A | 11/1999 | Rierden et al. | |
| 5,980,078 A | 11/1999 | Krivoshein et al. | |
| 5,983,016 A | 11/1999 | Brodsky et al. | |
| 6,011,899 A | 1/2000 | Ohishi et al. | |
| 6,032,208 A | 2/2000 | Nixon et al. | |
| 6,044,217 A | 3/2000 | Brealey et al. | |
| 6,063,129 A | 5/2000 | Dadd et al. | |
| 6,081,899 A | 6/2000 | Byrd | |
| 6,098,116 A | 8/2000 | Nixon et al. | |
| 6,101,531 A | 8/2000 | Eggleston et al. | |
| 6,195,591 B1 | 2/2001 | Nixon et al. | |
| 6,208,987 B1 | 3/2001 | Nihei | |
| 6,234,899 B1 | 5/2001 | Nulph | |
| 6,266,726 B1 | 7/2001 | Nixon et al. | |
| 6,275,977 B1 | 8/2001 | Nagai et al. | |
| 6,308,168 B1 | 10/2001 | Dovich et al. | |
| 6,308,224 B1 | 10/2001 | Leymann et al. | |
| 6,311,187 B1 | 10/2001 | Jeyaraman | |
| 6,327,511 B1 | 12/2001 | Naismith et al. | |
| 6,336,152 B1 | 1/2002 | Richman et al. | |
| 6,356,920 B1 | 3/2002 | Vandersluis | |
| 6,377,957 B1 | 4/2002 | Jeyaraman | |
| 6,393,566 B1 | 5/2002 | Levine | |
| 6,398,106 B1 | 6/2002 | Ulvr et al. | |
| 6,409,082 B1 | 6/2002 | Davis et al. | |
| 6,411,987 B1 | 6/2002 | Steger et al. | |
| 6,415,983 B1 | 7/2002 | Ulvr et al. | |
| 6,425,051 B1 | 7/2002 | Burton et al. | |
| 6,438,744 B2 | 8/2002 | Toutonghi et al. | |
| 6,445,963 B1 | 9/2002 | Blevins et al. | |
| 6,446,202 B1 | 9/2002 | Krivoshein et al. | |
| 6,457,053 B1 | 9/2002 | Satagopan et al. | |
| 6,469,986 B1 | 10/2002 | Lecheler et al. | |
| 6,473,656 B1 | 10/2002 | Langels et al. | |
| 6,484,061 B2 | 11/2002 | Papadopoulos et al. | |
| 6,501,996 B1 | 12/2002 | Bieber | |
| 6,505,247 B1 | 1/2003 | Steger et al. | |
| 6,510,352 B1 | 1/2003 | Badavas et al. | |
| 6,539,271 B2 | 3/2003 | Lech et al. | |
| 6,539,430 B1 | 3/2003 | Humes | |
| 6,539,458 B2 | 3/2003 | Holmberg | |
| 6,631,519 B1 | 10/2003 | Nicholson et al. | |
| 6,643,555 B1 | 11/2003 | Eller et al. | |
| 6,661,426 B1 | 12/2003 | Jetha et al. | |
| 6,664,981 B2 | 12/2003 | Ashe et al. | |
| 6,681,227 B1 | 1/2004 | Kojima et al. | |
| 6,687,817 B1 | 2/2004 | Paul | |
| 6,697,797 B1 | 2/2004 | Hoggatt et al. | |
| 6,704,746 B2 | 3/2004 | Sokolov et al. | |
| 6,714,949 B1 | 3/2004 | Frey, Jr. | |
| 6,714,981 B1 | 3/2004 | Skaggs | |
| 6,738,821 B1 | 5/2004 | Wilson et al. | |
| 6,745,089 B2 | 6/2004 | Rasmussen et al. | |
| 6,748,486 B2 | 6/2004 | Burton et al. | |
| 6,751,634 B1 | 6/2004 | Judd | |
| 6,758,403 B1 | 7/2004 | Keys et al. | |
| 6,760,721 B1 | 7/2004 | Chasen et al. | |
| 6,760,732 B2 | 7/2004 | Busshart et al. | |
| 6,763,395 B1 | 7/2004 | Austin | |
| 6,766,312 B2 | 7/2004 | Landt | |
| 6,769,095 B1 | 7/2004 | Brassard et al. | |
| 6,778,537 B1 | 8/2004 | Ishibashi | |
| 6,799,080 B1 | 9/2004 | Hylden et al. | |
| 6,801,822 B1 | 10/2004 | Fujiwara et al. | |
| 6,807,632 B1 | 10/2004 | Carpentier et al. | |
| 6,809,732 B2 | 10/2004 | Zatz et al. | |
| 6,836,892 B2 | 12/2004 | Ikoma et al. | |
| 6,839,790 B2 | 1/2005 | Barros De Almeida et al. | |
| 6,842,769 B1 | 1/2005 | Kim et al. | |
| 6,853,920 B2 | 2/2005 | Hsiung et al. | |
| 6,865,509 B1 | 3/2005 | Hsiung et al. | |
| 6,868,413 B1 | 3/2005 | Grindrod et al. | |
| 6,874,145 B1 | 3/2005 | Ye et al. | |
| 6,874,146 B1 | 3/2005 | Iyengar | |
| 6,880,060 B2 | 4/2005 | Talagala et al. | |
| 6,889,282 B2 | 5/2005 | Schollenberger | |
| 6,901,578 B1 | 5/2005 | Beaven et al. | |
| 6,904,473 B1 | 6/2005 | Bloxham et al. | |
| 6,920,474 B2 | 7/2005 | Walsh et al. | |
| 6,928,521 B1 | 8/2005 | Burton et al. | |
| 6,930,985 B1 | 8/2005 | Rathi et al. | |
| 6,934,749 B1 | 8/2005 | Black et al. | |
| 6,938,079 B1 | 8/2005 | Anderson et al. | |
| 6,944,626 B2 | 9/2005 | Cameron et al. | |
| 6,947,947 B2 | 9/2005 | Block et al. | |
| 6,950,900 B1 | 9/2005 | McKean et al. | |
| 6,954,770 B1 | 10/2005 | Carlson et al. | |
| 6,961,728 B2 | 11/2005 | Wynblatt et al. | |
| 6,973,556 B2 | 12/2005 | Milligan et al. | |
| 6,975,913 B2 | 12/2005 | Kreidler et al. | |
| 2002/0012401 A1 | 1/2002 | Karolys et al. | |
| 2002/0013748 A1 | 1/2002 | Edmison et al. | |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0194577 A1 | 12/2002 | Connor et al. | |
| 2003/0014387 A1 | 1/2003 | Kreidler et al. | |
| 2003/0065673 A1 | 4/2003 | Grobler et al. | |
| 2003/0090514 A1 | 5/2003 | Cole et al. | |
| 2003/0120710 A1 | 6/2003 | Pulsipher et al. | |
| 2003/0123467 A1 | 7/2003 | Du et al. | |
| 2003/0126308 A1 | 7/2003 | Kim | |
| 2003/0177114 A1 | 9/2003 | Lin et al. | |
| 2003/0212828 A1 | 11/2003 | Miyazaki et al. | |
| 2003/0218641 A1 | 11/2003 | Longobardi | |
| 2004/0006401 A1 | 1/2004 | Yamada et al. | |
| 2004/0024995 A1 | 2/2004 | Swaine | |
| 2004/0044421 A1 | 3/2004 | Brune et al. | |
| 2004/0073565 A1 | 4/2004 | Kaufman et al. | |
| 2004/0098153 A1 | 5/2004 | Neudeck | |
| 2004/0167790 A1 | 8/2004 | Grasse | |
| 2004/0196855 A1 | 10/2004 | Davies et al. | |
| 2004/0199655 A1 | 10/2004 | Davies et al. | |
| 2004/0203620 A1 | 10/2004 | Thome et al. | |
| 2004/0210629 A1 | 10/2004 | Klindt et al. | |
| 2004/0249771 A1 | 12/2004 | Berg et al. | |
| 2004/0260591 A1 | 12/2004 | King | |
| 2005/0005289 A1 | 1/2005 | Adolph et al. | |
| 2005/0044112 A1 | 2/2005 | Yamamoto et al. | |
| 2005/0065829 A1 | 3/2005 | Birkhoelzer | |

| | | |
|---|---|---|
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0259160 A1* | 11/2006 | Hood et al. .................. 700/20 |
| 2007/0019641 A1* | 1/2007 | Pai et al. ..................... 370/389 |
| 2007/0073426 A1* | 3/2007 | Chand ........................ 700/87 |
| 2008/0077512 A1 | 3/2008 | Grewal |

OTHER PUBLICATIONS

Pitzek et al., Configuration and Management of a Real-Time Smart Transducer Network, 2003 IEEE, 2003 4 pages.

European Search Report dated Jun. 12, 2005 for European Patent Application Serial No. EP05016793, 3 pages.

John Kubiatowicz, et al. "OceanStore: An Architecture for Global-Scale Persistent Storage" ASPLOS 2000, Cambridge, Massachusetts (2000).

Roy Goldman, et al. "From Semistructured Data to XML: Migrating the Lore Data Model and Query Language" (1999).

Written Opinion and International Search Repoert for PCT Patent Application No. PCT/US06/37000, Jul. 7, 2008, 10 pages.

* cited by examiner

DATA PERSPECTIVES IN CONTROLLER SYSTEM AND PRODUCTION MANAGEMENT SYSTEMS

TECHNICAL FIELD

The subject invention relates to industrial control systems and, more particularly, to utilizing a filter to grant and/or deny access to data.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Furthermore, updating data structures of controllers is associated with another array of implementation problems. For instance, some legacy controllers or other devices may not be associated with sufficient memory and/or processing power to support an updated application, and it is not cost effective for a company to replace every controller within an enterprise. Therefore, not only will multiple copies of data be existent within an industrial automation environment, but multiple copies of disparately structured data will be existent upon a network. Applications may require disparate mapping modules to enable mapping between controllers associated with first and second architectures. Thus, simply updating an architecture of controllers does not alleviate current deficiencies associated with industrial controllers in an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to filtering data, and in particular fractionating data modeled on a hierarchical structured data model. The hierarchically structured data model described herein facilitates nested structures, thereby mitigating deficiencies associated with data models that employ flat namespaces. Such hierarchically structured data models can be representative of data from the enterprise-level down to the workcell level and/or device/process level, thereby providing a more or less granular representation of a commercial manufacturing enterprise in its totality. The subject matter as claimed herein further utilizes biometric information, access control lists and capabilities in order to fractionate data structured in a hierarchical manner and to present to one or more users customize views of the hierarchical data based at least in part on that individual user's biometric information, user identification, password, group affiliations, and the like.

The claimed subject matter can for example, utilize one of the plethora of browser technologies currently available (e.g., Internet Explorer, Firefox, Netscape . . . ). In addition, the claimed subject matter can employ HTML, XML, SGML, Bioinformatic Sequence Markup Language (BSML), etc. to facilitate presentation of customized data to one or more users, as well as to facilitate interaction between individual users and the subject matter as claimed. In addition, with respect to filtering hierarchical structured data for subsequent presentation to a user(s), the claimed subject matter can build an ad hoc network and database during periods of crisis, such as network failure between a programmable logic control and the enterprise resource system under which the programmable logic controller is subordinate. Moreover, the claimed subject matter discloses a legacy intermediary component that can be interpositioned between one of more legacy programmable logic controller or other industrial automation equipment/devices, such as, motor starters, switches, displays, etc. and an Enterprise Resource Planning (ERP) system or Supply-Chain Management system to facilitate filtering the hierarchically structured data with the filtering technology/methodology disclosed herein.

The filtering technology elucidated herein can be incorporated into a programmable logic controller, or can form part of an intermediary component. The filter component as disclosed, in addition to being a constituent part of a programmable logic controller and/or legacy intermediary component, can itself include a security component/aspect, and interface generation aspect/component, and a machine learning and reasoning aspect, for example.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features will become apparent from the following detailed description of the invention when considered in conjunction with the drawings.

DETAILED DESCRIPTION

Figure 1:
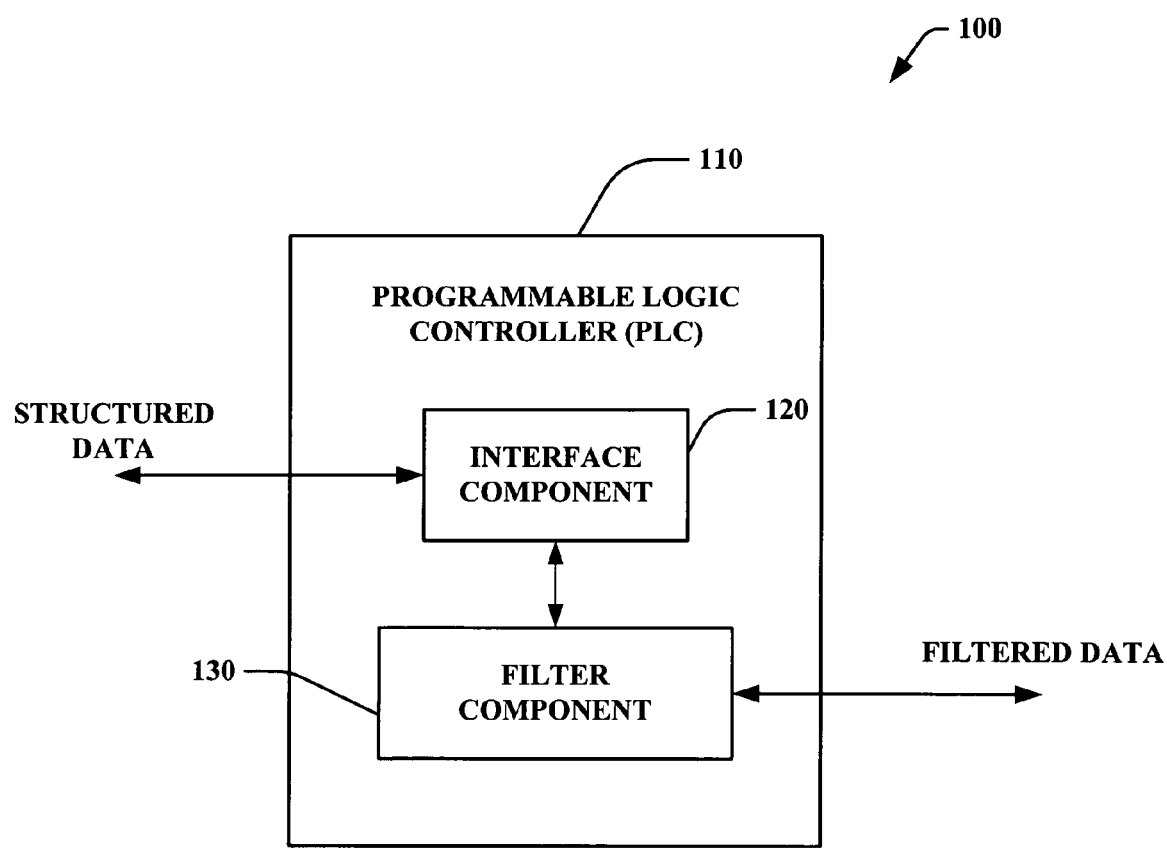
FIG. 1 illustrates a programmable logic controller receiving and/or transmitting structured and/or filtered data.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs. Additionally, it is to be appreciated that while the components utilized and illustrated herein are depicted as being distinct and individual for purposes of elucidation, the disparate components enumerated herein can nevertheless be combined in a plethora of manners, or even into a single consolidated entity and still fall within the ambit of the claimed subject matter.

Turning now to the drawings, FIG. 1 illustrates a programmable logic controller 110 that receives and/or transmits structured data from and/or to an external source via an interface component 120. The interface component 120 can thereupon convey the received and/or transmitted structured data from/to a filter component 130 that manipulates the received and/or transmitted structured data and generates filtered data that is input/output to/from one or more industrial automation devices (e.g., motor starters, solenoids, pilot lights/displays, speed drives, valves, etc.). The structured data received/transmitted by the interface component 120, for example, can comprise hierarchically structured data designed at least in part in compliance with one or more proprietary, national and/or international standards, such as, for instance, ISA S88, ISA S95, OMAC, and/or any suitable combination thereof. In addition, the structured data can be executed and/or created by the programmable logic controller 110. Thus, the data can be in the form of objects that conform to a hierarchically structured data model and can be representative of particular devices, portions of device, processes, portions of processes, and the like. The programmable logic controller 110 can include at least a portion of a schema that enables such controller to recognize and output data that is structured in accordance with the hierarchically structured data model. The programmable logic controller 110, through the utilization of this data model, can interact with other controllers as well as high-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller 110, thereby enabling seamless communication between programmable logic controllers and ERP systems. Conventional systems, in contrast, often require ad-hoc programming to map between low-level logic utilizing controllers with more advanced object oriented programming languages often employed within ERP systems. Another common use would be to interact with a Supply-Chain Management (SCM) system.

The hierarchically structured data model can be designed in such a manner as to enable the data to correspond to a hierarchical arrangement of systems and/or a hierarchical arrangement of processes that occur within the plant. Moreover, the hierarchically structured data model can be designed in a manner that enables modeling of a plant across system and/or process boundaries. For instance, today's manufacturing facilities include batch processing, continuous processing, discrete processing, as well as inventory processing. Communication of meaningful data between these systems and processes is extremely difficult, as they are often designed and operated without regard for adjacent processes. The hierarchically structured data model can thus be implemented so that substantially similar structure is provided with respect to a batch process, a continuous process, a discrete process, and inventory tracking. Nevertheless, the structured data envisioned and/or utilized herein is not so limited; consequently, it is to be understood that any and all suitable hierarchically and/or non-hierarchically structured data, or any combination thereof, can fall within the ambit and purview of the claimed subject matter.

The programmable logic controller 110 can be a microprocessor based device with either modular and/or integral input/output circuitry that monitors the status of field connected sensor inputs and controls attached devices according to user-created programs stored in memory. Thus, the programmable logic controller 110, in addition to comprising the illustrated interface component 120 and filter component 130 as depicted in FIG. 1, can also include a processor, for example, a central processing unit (CPU), control processor, logic processor and/or ladder processor. Further, the programmable logic controller 110 may also comprise, for instance, one or more I/O processor dedicated to performing I/O functions, one or more shared memories (e.g., RAM, SDRAM, DRAM, etc.) as well as one or more cached memories with which the processor and I/O processor can be coupled.

The filter component 130 can receive and/or transmit filtered data from or to one or more industrial automation devices. This filtered data can, for example, be sent and/or received by the filter component 130 in one or more proprietary format, one or more industry standard format, or any combination thereof. For example, filtered data can include digital or discrete signals such as ON or OFF signals (e.g., 1 or 0, TRUE or FALSE respectively) that are judged using either voltage or current, where a specific range is denominated as ON and another range is specified as OFF. For instance, a programmable logic controller can use 24 V DC I/O, with values above 22 V DC representing ON and values below 2 V DC representing OFF. Filtered data can also include analog signals that yield a range of values between zero and full-scale which typically can be interpreted as integer values with various ranges of accuracy depending on the device and the number of bits available to store the data. Like digital signals, analog signals can use voltage or current, but do not have discrete ranges for ON or OFF. Rather analog signals work in a defined range of values where an I/O device can operate reliably.

The filter component 130 further manipulates the data that it receives. For example, when the filter component 130 receives structured data conveyed to it from the interface component 120, the filter component 130 deconstructs the structured data to produce filtered data in order to make the received structured data comprehensible to one or more industrial automation device or user. Conversely, when the filter component 130 receives filtered data from one or more industrial automation devices, the filter component 130 can reconstitute the filtered data into structured data employable by one or more external sources, such as for example, an Enterprise Resource Planning (ERP) system.

Further, the filter component 130 can, upon receipt of the structured data utilize one or more lustration criteria such as factory presets, biometric information, passwords, location, and user identification parameters, for example, to provide customized views and representations of the structured data. The filter component 130 can for instance dynamically generate one or more user interfaces via the interface component 120 based at least in part upon the lustration criteria provided.

Figure 2:
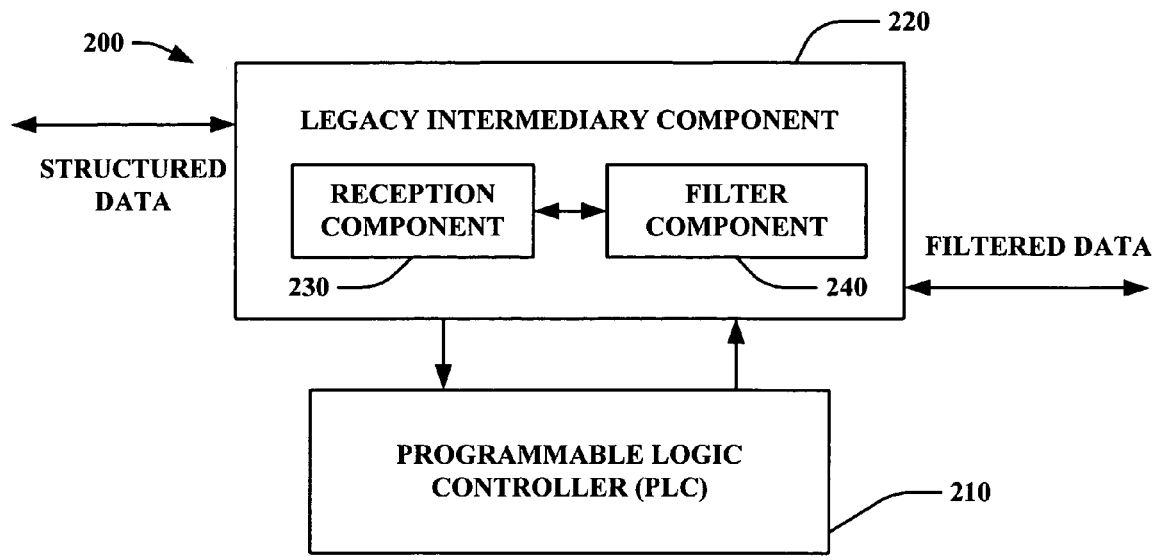
FIG. 2 depicts a programmable logic controller that acts in concert with a legacy intermediary component that transmits and/or receives structured and/or filtered data.

With reference to FIG. 2, a programmable logic controller 210 and a legacy intermediary component 220 are depicted therein. The programmable logic controller 210 receives and delivers data to a legacy intermediary component 220 in one or more formats. These formats or protocols can for instance comply with proprietary data representations, industry standard representations, or alternatively, any combination industry standard and proprietary data representation can be adopted and utilized. Thus, the programmable logic controller 210 can be a legacy controller and/or a third party controller in that the programmable logic controller 210 does not need to support a state-based and/or a hierarchically structured data model.

The legacy intermediary component 220, in addition to receiving and transmitting data to the programmable logic controller 210, can also receive and deliver structured data from external sources and can provide filtered data for subsequent utilization. The legacy intermediary component 220 can include a reception component 230 that receives data from an external source and that communicates the data to a filter component 240. The filter component 240 on receipt of this data then utilizes one or more elutriation parameters to fractionate the received data to provide various user perspectives thereby filtering out data that is irrelevant and/or unnecessary to the requirements of a particular perspective/user.

Figure 3:
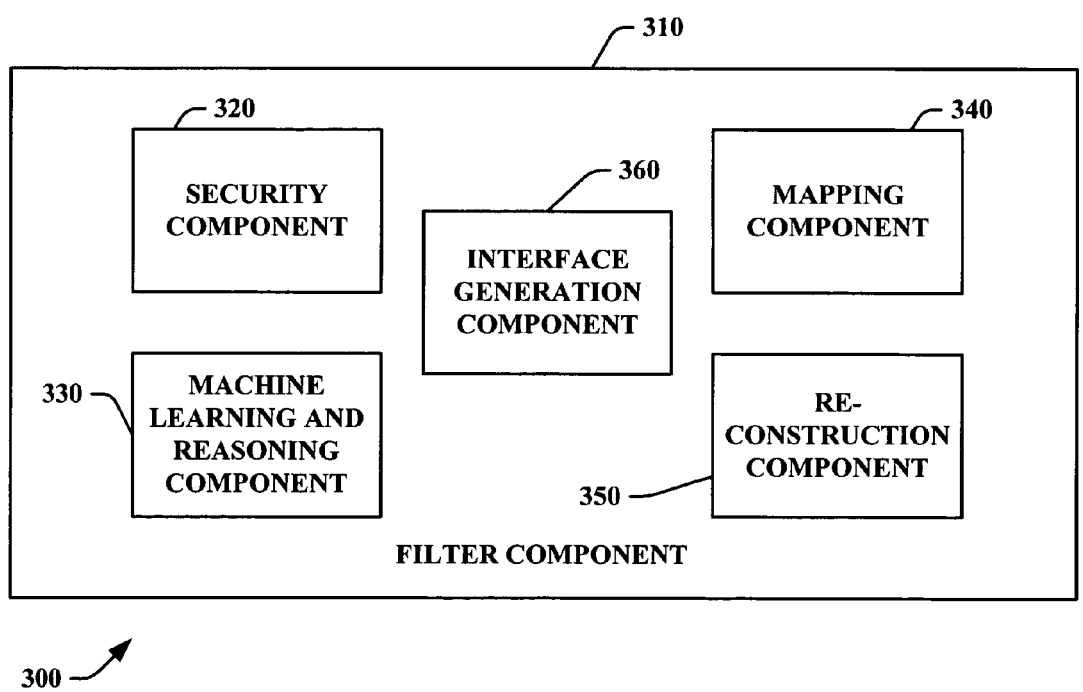
FIG. 3 illustrates a more detailed representation of a subset of possible and/or permissible components embodied in the filter component of the claimed subject matter.

Turning now to FIG. 3, a more detailed depiction of the filter component 310 is illustrated. The filter component 310 can comprise, for example, a security component 320, a machine learning component 330, a mapping component 340, a reconstruction component 350 and an interface generation component 360. The security component 320 can be utilized by the filter component 310 to ascertain relevant information with respect to a particular user or process that wishes to gain access to both filtered data and/or structured data. In this manner the security component 320 can ensure that legitimate users and/or processes are allowed to perform actions and functions that may have been granted that particular user/process. Such a security component 320 assures not only that accredited and/or authorized processes and users can gain access to pertinent information, but also that these processes and/or users will be able to perform the tasks that they are required to undertake.

The security component 320 can, for example, use biometric data with respect to a particular user to enforce privilege separation, where privilege separation entails providing a process and/or user with only those privileges and data necessary to facilitate tasks within the circumscribed ambit of the privilege(s) granted. The biometric data utilized by the security component 320 can include human physiological characteristics such as fingerprints, retinal and/or iris recognition, voice patterns, and hand measurements, for example. Additionally, the biometric information utilized by the security component 320 can also include, but is not limited to, signature recognition, gait recognition and typing pattern (rhythm) recognition, as well as anthropometric information such as lengths and widths of the head and body, as well as, individual markings, for example, tattoos, scars and/or birthmarks.

In addition to the aforementioned biometric information, the security component 320 can employ a facial recognition system to ascertain the identity of a particular user wishing to access or manipulate data and/or processes. The facial recognition system utilized by the security component 320 can employ, for example, a recognition algorithm based at least in part on eigenface, fisherface, the hidden markov model and neuronal motivated dynamic link matching. Further, the facial recognition system can also include utilization of three-dimensional face recognition, as well as, employment of the visual details of facial skin, for example.

The security component 320 can also enforce privilege separation via utilization of Access Control Lists (ACLs) and/or capabilities. The security component 320 can determine the appropriate access rights to be granted to a particular process, user, group of users and/or hierarchical aspect of structured data based at least in part on an access control list. The access control list can be a data structure, for example, a table, which contains entries to specify individual user and group rights to specific system objects such as programs, processes, files, devices and/or levels within the hierarchical structure data. The privileges or permissions granted determine specific access rights, such as whether a user and/or process can read from, write to, modify, and/or execute an object, or access a device(s). In addition, the access control list can determine, for example, whether or not a user, a group of users, a process, or group of processes can alter the access control list on an object and/or a device. The security component 320 in addition to utilizing Access Control Lists to enforce privilege separation, can also implement capabilities (also known as keys). Capabilities are typically implemented as privileged data structures that consist of a section that specifies access rights, and a section that uniquely identifies the object, process, and/or level within the hierarchical data structure to be accessed.

The security component 320, in addition to the aforementioned exemplary privilege separation mechanisms, can also provide full audit trails of system activity, so that the mechanism and full extent of a breach can be determined. The security component 320 in order to facilitate providing full audit trails generates a security log and stores this log in a remote location, wherein the log can only be appended to. The security log can, for example, store information based at least in part on biometric information, user identification (UID), process identification (PID), group identification (GID), or any combination thereof. Further, security information stored in the security log can be based on other factors, for example, time, location within a production line, geographical location of a factory environment (e.g., utilizing Global Positioning Satellite (GPS) or Radio Frequency Identification (RFID) technologies), etc.

The filter component 310 can further include a machine learning and reasoning component 330. Machine learning and reasoning component 330 can employ various machine learning and reasoning based schemes for carrying out various aspects of the claimed subject matter. For example, the machine learning and reasoning component 330 can be utilized by, and in conjunction with, a security component 320, the interface generation component 360, a mapping component 340 and/or a reconstruction component 350. For instance, the machine learning and reasoning component 330 can be used in conjunction with the interface generation component 360 and the security component 330 to generate a customized user-interface based at least in part on information supplied by security component 330. In addition, the machine learning and reasoning component 330, can for example, undertake an evaluation of one or more Quality of Service (QoS) attributes associated with a physical environment (e.g., network, processor(s), display capability . . . ) and generate one or more customized perspectives of the hierarchically structured data based at least in part on these attributes. For example, the determination of which of the one or more customized perspectives of the hierarchically structured data to be propagated to a requesting user and/or a receiving industrial automation device can be predicated at least in part on a comparison between the QoS attributes established by the machine learning and reasoning component 330 and the one or more QoS attributes encapsulated within the hierarchically structured data itself. Nevertheless, it should be appreciated that while one or more QoS attributes can be generated by the machine reasoning and learning component 330, it is to be understood that any and all other components disclosed herein can undertake and perform this functionality.

Further, it is to be appreciated that the machine learning and reasoning component 330 can provide for reasoning about or infer states of the system, environment, processes, levels within the hierarchical data structure, and/or a user from a set of observations captured via events and/or data. Inference can be employed to identify a specific context or action, or can generate a probability distribution of the states, for example. The inference can be probabilistic—that is, the computation of a probability distribution of the states of interest based on a consideration of data and events. Inference can also refer to techniques employed for composing higher level events from a set of events and/or data. Such inference results in the construction of new events or actions from a set of observed events and/or stored event data, whether or not the events are correlated in close temporal proximity, and whether the events and data come from one of several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=$confidence (class). Such classification can employ a probabilistic and/or statistical based analysis (e.g. factoring into the analysis utilities and costs) to prognose or infer an action that a user or process desires to be automatically performed. A support vector machine (SVM) is an example of a classifier that can be employed. The SVM operates by finding a hypersurface in the space of possible inputs wherein the hypersurface attempts to split the triggering criteria from a non-triggering event. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The filter component 310 depicted in FIG. 3 can further include the mapping component 340 that maps hierarchically structured data received from one or more external data sources into data comprehensible by one or more programmable logic controllers and/or industrial automation device. The mapping component 340 can employ one or more predefined templates to accomplish the mapping, or additionally and/or alternatively, the mapping component 340 can generate the necessary templates in conjunction with the machine learning and reasoning component 330, and thereupon can utilize the generated templates to transform/map the hierarchical structured data received from external sources into information utilizable by one or more programmable logic controllers.

The filter component 310 can further include the reconstruction component 350 that receives data from a programmable logic controller and/or industrial automation device and reconstitutes this data into hierarchically structured data. The reconstruction component 350, like the mapping component 340 elucidated above, can employ one or more predefined templates to accomplish the reconstitution, or additionally and/or alternatively, the reconstruction component 350 can generate the necessary templates in conjunction with the machine learning and reasoning component 330, and thereupon utilize the generated templates to transform/reconstitute the data received from a programmable logic controller into hierarchically structured data.

Additionally, the filter component 310 can also include an interface generation component 360 that can provide various types of user interfaces to facilitate interaction between a user and the programmable logic controller. The interface generation component 360 determines the appropriate interface to generate based at least in part on information received from the security component 320, the machine learning and reasoning component 330, the mapping component 340 and/or the reconstruction component 350. It is to be understood that the interface generation component 360 can provide a customized interface for each and every authorized individual or group of individuals who have access to the system. Thus, the interface generation component 360 can provide one or more customized graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation, such as vertical and/or horizontal scrollbars for navigation, and tool buttons to determine whether a region will be viewable can be employed.

Figure 4:
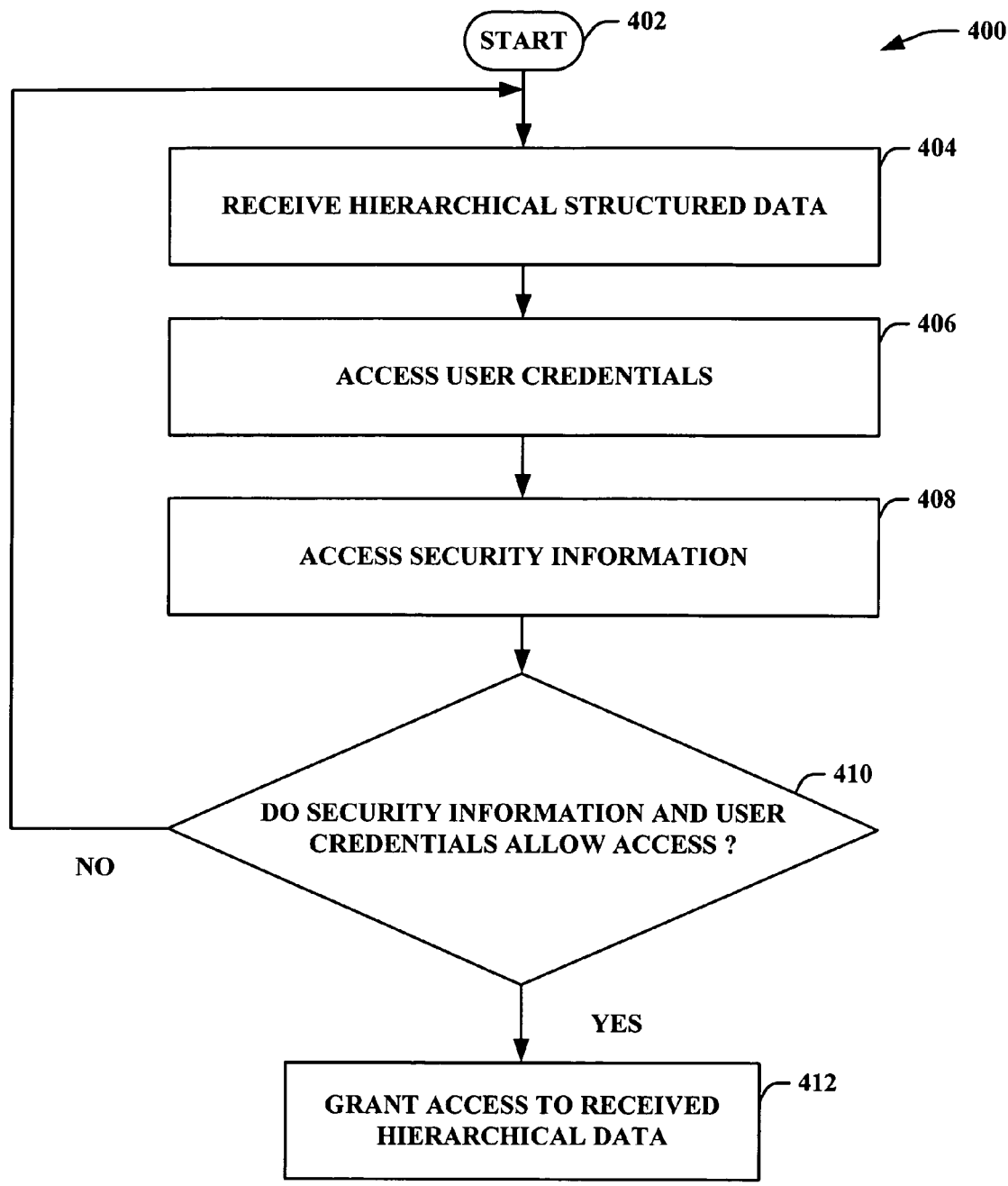
FIG. 4 represents a methodology that can be utilized by a filter component within a programmable logic controller or legacy intermediary component to grant access to hierarchically structured data.
Figure 5:
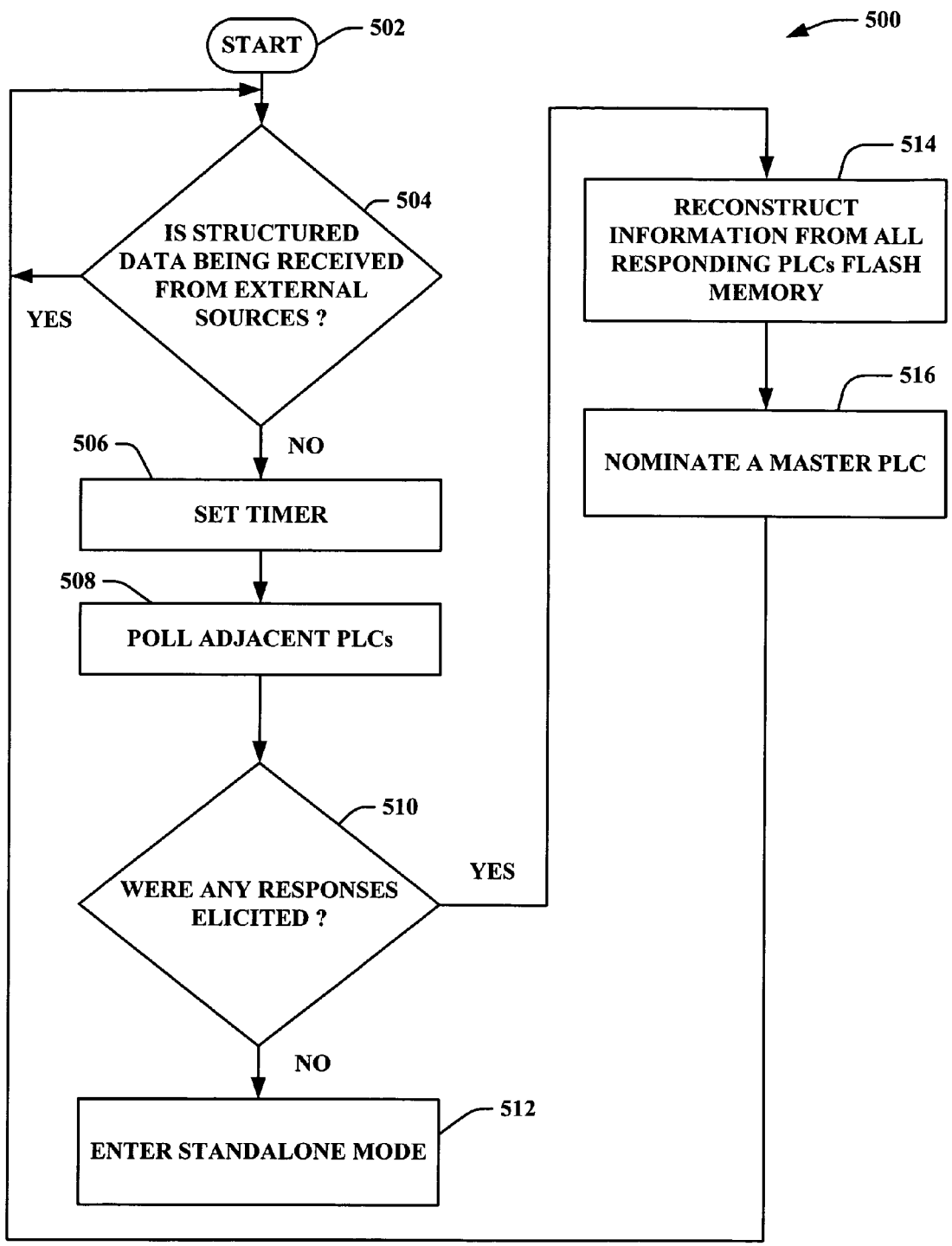
FIG. 5 illustrates a methodology that can be employed by the filter component and/or a legacy intermediary component to form an ad hoc network.
Figure 6:
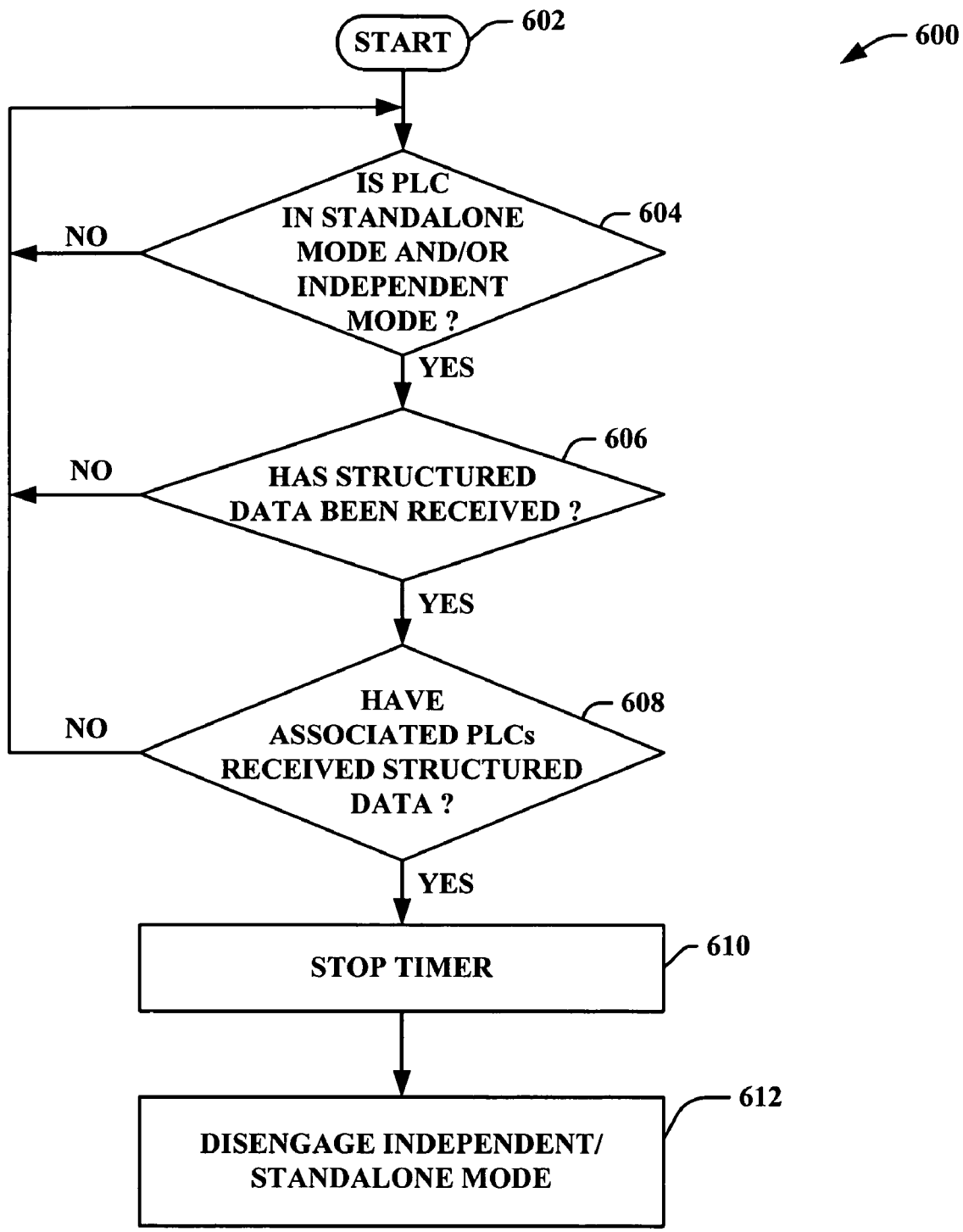
FIG. 6 depicts a methodology that can be used by the filter component and/or a legacy intermediary component to deconstruct and/or disengage an ad hoc network.

Referring to FIGS. 4-6, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 4, a methodology 400 for dynamically granting access to hierarchically structured data within a programmable logic controller is illustrated. The methodology commences at 402, and at 404 the programmable logic controller receives hierarchically structured data. The programmable logic controller can, for example, receive the hierarchically structured data from an ERP system, another programmable logic controller, and/or a process. Review of this hierarchically structured data can reveal a significant amount of information, such as, process being monitored, associations with other processes, location in a factory of a process, etc. Moreover, the programmable logic controller can receive process and output state-based data (objects). For example, an object can indicate state of a process as well as status of field sensors and actuators. At 406 the programmable logic controller accesses user credentials from a user attempting to access the received hierarchically structured data. User credentials may be supplied by a security component wherein biometric information and the like can be utilized, and/or can be supplied by requesting the user to enter a user identification and password. At 408 the programmable logic controller accesses security information, the security information can be supplied by one or more databases located remotely from the programmable logic controller, and/or from one or more files stored in the memory of the programmable logic controller. At 410 an evaluation is undertaken to determine whether the security information retrieved from the one or more databases at 408 and the user credentials supplied at 406 warrant granting access to the received hierarchical structured data to the user requesting access. If the evaluation at 410 is affirmative, access is granted to the received hierarchically structured data at 412. If however, the evaluation 410 is negative, the methodology loops back to 404 and access is denied.

With reference to FIG. 5, a methodology 500 for utilizing a programmable logic controller to build an ad hoc network during times of crisis, such as, for example, network failures, is illustrated. The methodology commences at 502, and 504 a determination is made as to whether hierarchically structured data is being received or requested. If the result of the determination is affirmative, the methodology moves back to the beginning, e.g., 504. If however the result of the determination is negative, the methodology proceeds to 506 at which point a timer is set. The timer utilized herein can be a constituent part of a programmable logic controller. Upon actuating the timer the methodology proceeds to 508 wherein the programmable logic controller polls adjacent programmable logic controllers. At 510 the methodology ascertains the results of the polling that was undertaken at 508. If it is determined at 510 that no responses were received from the polling undertaken at 508, the programmable logic controller enters into a standalone mode at 512. If, on the other hand, one or more responses were elicited from adjacent programmable logic controllers the methodology proceeds to 514. At 514 one or more programmable logic controllers having determined that no structured data is being received or requested collaborate with one another to reconstruct information from all the responding programmable logic controllers to form an ad hoc network and database such that the one or more programmable logic controllers can continue operations during the network failure and/or crisis. The methodology then proceeds to 516 whereupon the one or more responding programmable logic controllers nominate a master programmable logic controller that for the duration of the network outage and/or crisis acts, for example, as a centralized repository of security information to ensure continuous operation of the factory environment. Once the nomination process to select a master programmable logic controller at 516 has completed the methodology returns to 504.

With regard to FIG. 6, a methodology 600 for disengaging from standalone/independent operation mode is depicted. The methodology starts at 602, and at 604 a determination is made as to whether a master programmable logic controller is currently in standalone mode/independent operation mode. If the result of the determination at 604 is negative the method returns to the beginning. If however the result of the determination at 604 is positive the method proceeds to 606 wherein another determination is undertaken to ascertain whether structured data from external sources is being currently received by the master programmable logic controller. If the result of this query is negative, the method returns to the beginning. If, on the other hand, the result of the query at 606 is positive the methodology proceeds to 608. At 608 the master programmable logic controller ascertains whether the at least one programmable logic controller associated with it are also receiving structured data. If at 608 the master programmable logic controller determines that no other associated programmable logic controller is receiving structured data the methodology returns to the beginning. If however at 608, the master programmable logic controller ascertains that the other associated and subordinate programmable logic controllers are receiving structured data then the methodology proceeds to 610. At 610 the timer that was started at the commencement of the crisis is stopped, and the method culminates at 612 wherein independent/standalone mode is disengaged.

Figure 7:
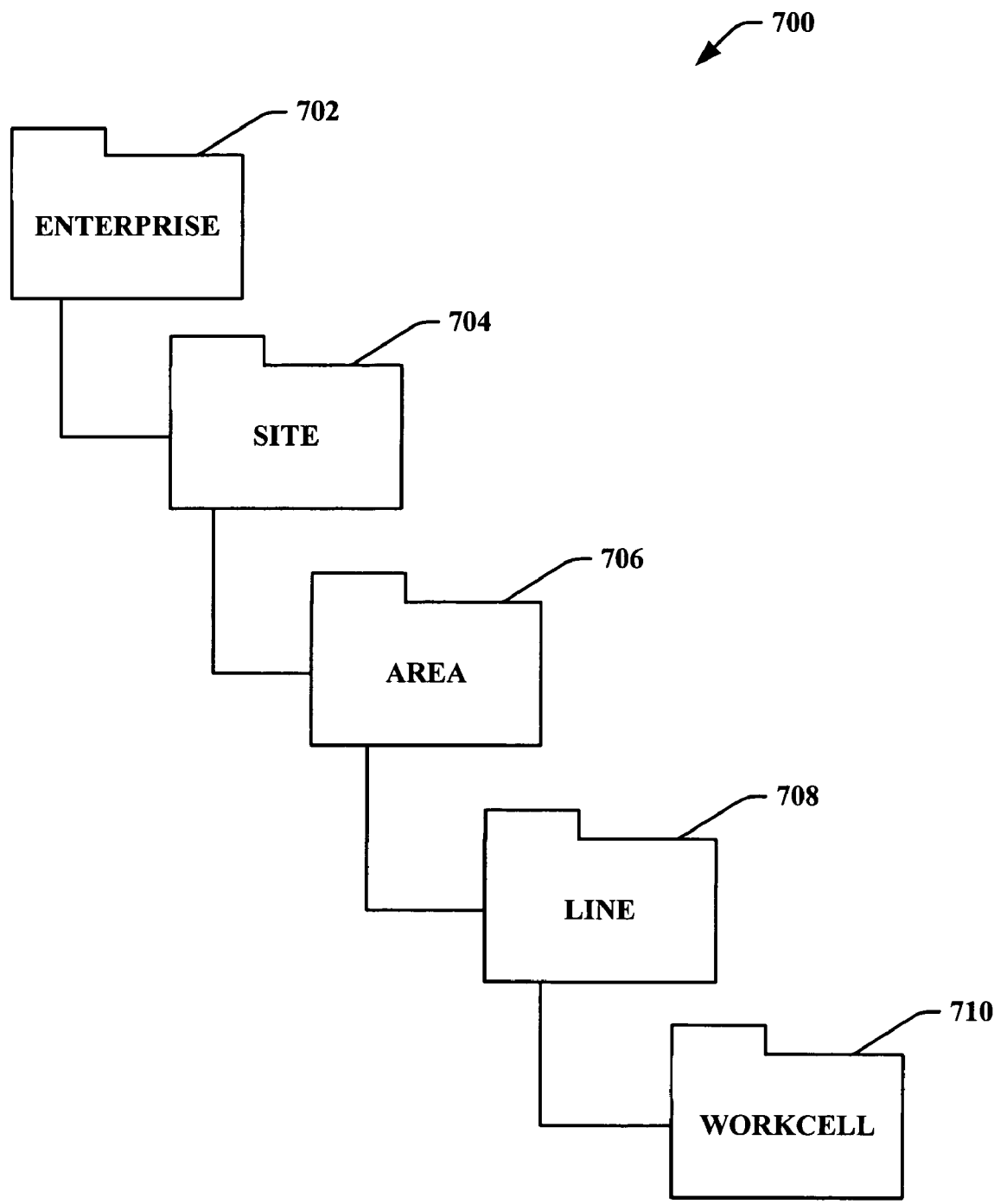
FIG. 7 is a visual representation of an exemplary structure upon which the hierarchically structured data model can be based.

With reference to FIG. 7, an exemplary hierarchical structure 700 which can be utilized in connection with the hierarchical structure data model described herein is depicted. The data model can facilitate nested structures, thereby mitigating deficiencies associated with data models that employ flat namespaces. The structure 700 includes an enterprise level 702, wherein a particular enterprise can be represented within data structured in accordance with a hierarchical data model. Beneath the enterprise level 702 can reside a site level 704, so that a particular factory (site) within an enterprise can be represented within a data packet. Beneath the site level 704 an area level 706 can exist, which specifies an area within the factory that relates to the data. A line level 708 can lie beneath the area level 706, wherein the line level 708 indicates a line associated with particular data. Beneath the line level 708 a workcell level can exist, thereby indicating a workcell associated with the data. Utilization of a nested, hierarchical data model enables programmable logic controllers to become more cognizant of data associated therewith. Moreover, the hierarchy 700 can for example be customized by an owner of such hierarchy such that more or less granularity of objects/levels can be achieved within the hierarchy if desired or necessary.

Figure 8:
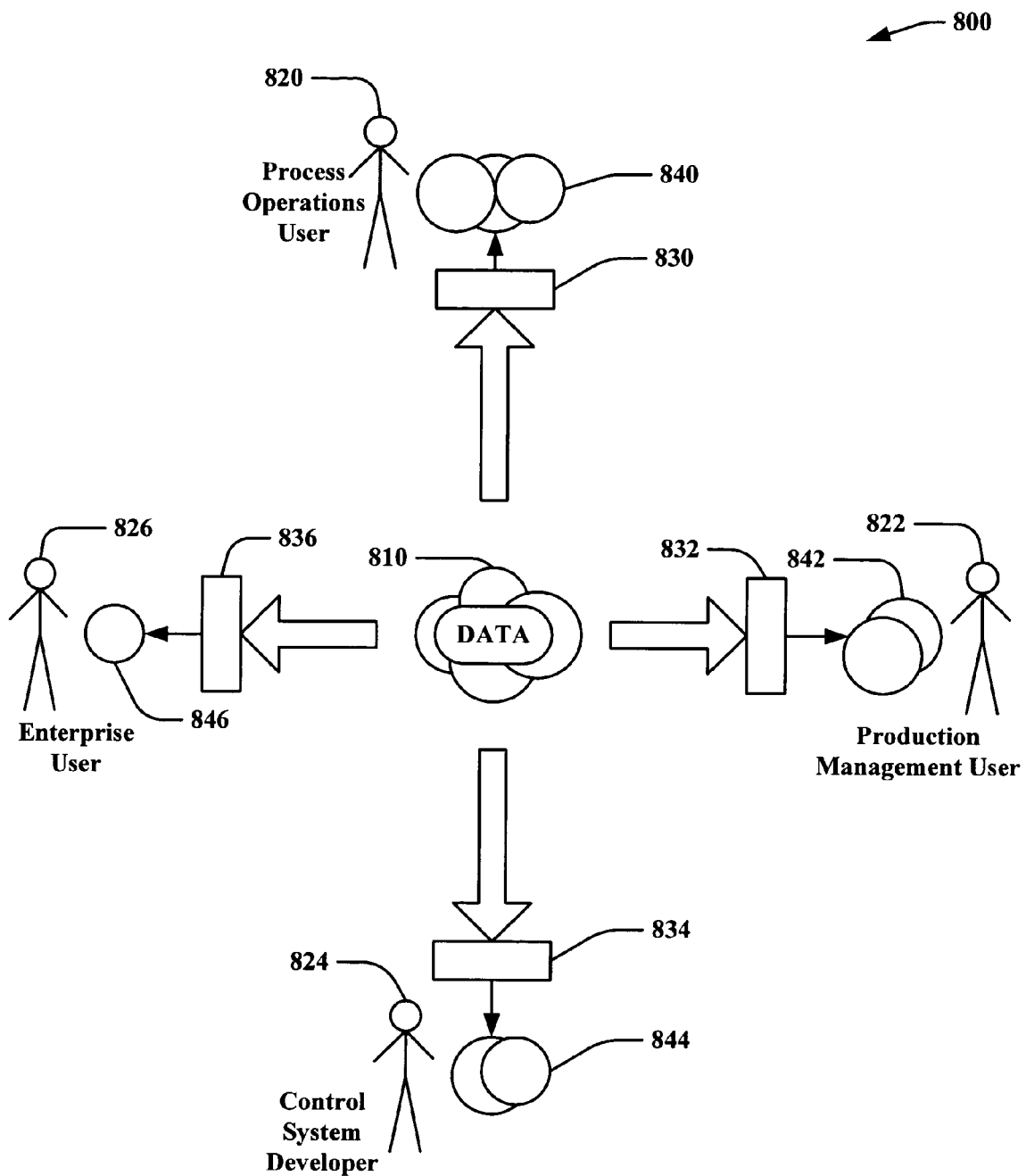
FIG. 8 is a visual representation of the exemplary filter component and/or legacy intermediary component being utilized to filter structured data.

FIG. 8 is an exemplary depiction 800 of the claimed subject matter in action, wherein one or more users who wish to view various aspects of the data 810 supplied by one or more programmable logic controllers is illustrated. It is to be understood that the data 810 supplied by the one of more programmable logic controllers can be, for example, hierarchically structured data. A user or operator, for example, process operator 820, desires to access one or more aspects of the data 810 supplied by, or existent within, the one or more programmable logic controllers. The process operator 820 accesses a graphical user interface (GUI) displayed on a computer display to enter user identification information. The graphical user interface can be supplied by a browser (e.g., Internet Explorer, Firefox, Netscape, etc.) or a command line prompt, for example. The process operator 820 upon authentication by the system via the browser or command line prompt is presented with only information that is relevant to his/her needs and for which the authenticated user is authorized to access. It is to be understood that data sent from 810 is intercepted by a filter 830 that filters out data based at least in part on filtering criteria, thus ensuring that the data presented to the user is only that subset of the data 810 relevant to the user's particular requirements. The filter 830 can effectively filter out irrelevant information based on a user's biometric information, location within a plant or factory floor environment, the geographical location of the factory, the user's group affiliations, and the users authenticated credentials, amongst other criteria. Once the filter 830 has filtered the incoming data 810 of all extraneous and irrelevant information from the perspective of the user 820, the filter 830 presents only relevant information that is displayed on one of more graphical user interface screens 840.

Similarly from the perspective of users 822, 824, and 826, different filtered information is provided through utilization of filters 832, 834 and 836 respectively. For example, from the perspective of a production management user 822, the data that is presented one or more graphical user interface screens 842 only pertains to production management information. While there can be an overlap as to the data presented to an individual process or user, it is to be understood that only that data that is relevant with regard to the user's authorized credentials is presented to the user and/or process. In a similar vein, the data displayed on one or more graphical user interface screens 844 presented by the filter 834 to the control system developer 824 is only that information from the totality of data 810 that is relevant to the control system developer 824 based on the control system developer's 824 authentication criteria. Moreover, with regard to the enterprise user 826, the filter 836 filters out all the information that is irrelevant to the enterprise user 826 and presents only information 846 pertinent to that particular user's requirements based on that individual user's identification criteria and/or group affiliations, for example.

Figure 9:
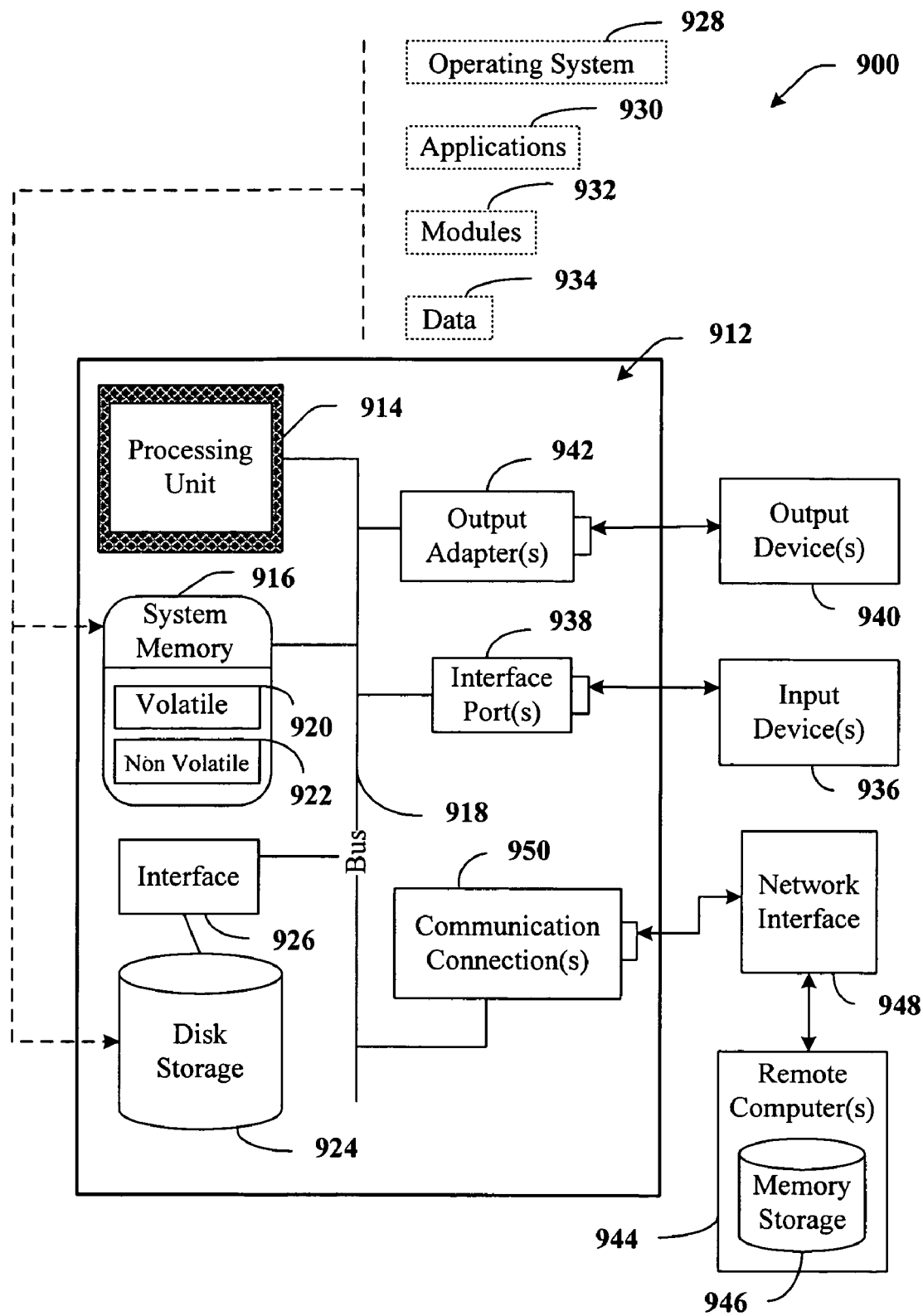
FIG. 9 is an example operating system upon which various features described herein can be implemented.

With reference to FIG. 9, an exemplary environment 900 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SPAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
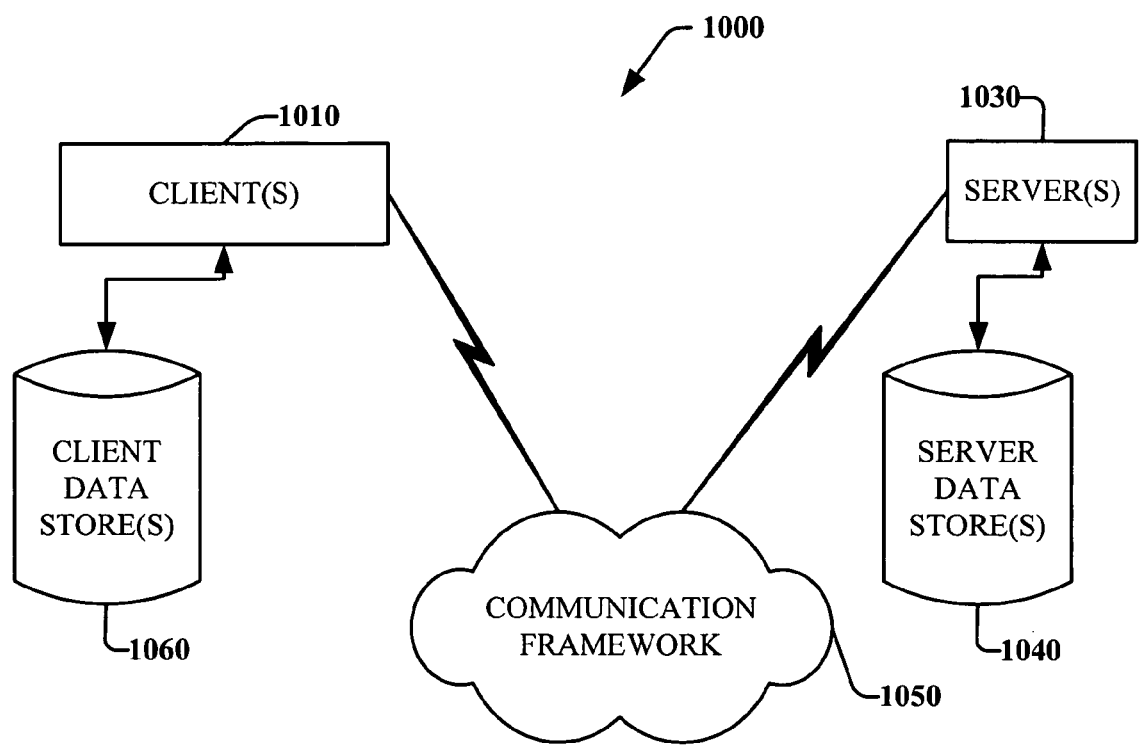
FIG. 10 is an exemplary computing environment within which various aspects described herein can interact.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A programmable logic controller, comprising:
an interface component associated with the programmable logic controller that receives data of a hierarchical structure; and
a filter component communicatively coupled with the interface component that filters the data based at least in part on one or more lustration criteria, the lustration criteria includes one or more of: factory presets, biometric information, passwords, or geographical information.

2. The programmable logic controller of claim 1, the data of the hierarchical structure conforms to one or more of ISA S88, ISA S95 and OMAC.

3. The programmable logic controller of claim 1, the filter component creates the data of the hierarchical structure.

4. The programmable logic controller of claim 1, the programmable logic controller communes with an Enterprise Resource Planning (ERP) system that utilizes the data of the hierarchical structure.

5. The programmable logic controller of claim 1, the programmable logic controller communicates with a Supply-Chain Management (SCM) system that utilizes the data of the hierarchical structure.

6. The programmable logic controller of claim 1, the data of the hierarchical structure comprises one or more multi-tiered tree.

7. The programmable logic controller of claim 1, the biometric information comprises one or more of human physiological characteristic, anthropometric information, signature recognition, gait recognition and typing rhythm recognition.

8. The programmable logic controller of claim 7, the human physiological characteristic includes at least one of fingerprints, retina recognition, iris recognition, voice patter recognition.

9. The programmable logic controller of claim 1, the anthropometric information includes one or more of length of head, length of limb, length of digits, length of body, weight of body, individual markings.

10. The programmable logic controller of claim 1, the filter component comprises:
a security component that grants access to the data of a hierarchical structure based at least in part on the one or more lustration parameters; and
a mapping component that maps data of a hierarchical structure into at least one data format comprehensible by one or more industrial automation device.

11. The programmable logic controller of claim 10, the security component employs one or more facial recognition algorithm to perform facial recognition.

12. The programmable logic controller of claim 11, the facial recognition algorithm includes one or more of eigenface, fisherface, hidden markov model and neuronal motivated dynamic link matching.

13. The programmable logic controller of claim 10, the security component employs access control list to ensure privilege separation.

14. The programmable logic controller of claim 10, the security component generates one or more log files.

15. The programmable logic controller of claim 14, the one or more log file contains at least one of biometric information, geographical location information, user identification data, and group identification data.

16. The programmable logic controller of claim 1, the interface component associated with a legacy intermediary component, comprising:
a reception component that receives hierarchically structured data; and
an elutriation component that fractionates the hierarchically structured data based at least on the lustration criteria.

17. The legacy intermediary component of claim 16, the elutriation component comprises:
a security component that utilizes the at least one lustration criteria to generate a customized view of the hierarchically structured data; and
a interface generation component that displays the customized view.

18. The legacy intermediary component of claim 17, the elutriation component further comprises a machine reasoning and learning component utilized by the security component to generate the customized view of the hierarchically structured data.

19. The legacy intermediary component of claim 18, the machine reasoning and learning component employs one or more classification approaches.

20. The legacy intermediary component of claim 19, the one or more classification approaches based at least in part on Bayesian networks, decision trees, fuzzy logic models, probabilistic and classification models.

21. The legacy intermediary component of claim 17, the interface generation component utilizes at least one or more of HTML, SGML, XML, BSML, to generate a customized user interface.

22. The legacy intermediary component of claim 16, the elutriation component further comprises a mapping component that maps hierarchically structured data into one or more format comprehensible by one or more programmable logic controller and one or more industrial automation device.

23. The legacy intermediary component of claim 22, the one or more industrial automation device includes one or more of a motor staffer, one or more motor, at least one solenoid, one or more pilot lights, one or more displays, one or more speed drives and one or more valves.

24. The legacy intermediary component of claim 16, the elutriation component further comprises a reconstruction component that employs one or more predefined templates to reconstitute data received from one or more industrial automation device into hierarchically structured data.

25. A computer implemented method to facilitate granting access to hierarchically structured data, comprising the following computer-executable acts:
employing a programmable logic controller to receive hierarchically structured data;
utilizing a graphical user interface to access user credentials from a user;
accessing security information related to the hierarchically structured data;
evaluating the security information and the user credentials utilizing machine learning; and
based on the evaluation, according access to the hierarchically structured data.

26. The method of claim 25, further comprising generating the graphical user interface utilizing at least one or more of HTML, SGML, XML, and BSML.

27. The method of claim 25, the user credentials includes biometric data comprises at least one of iris recognition, voice pattern recognition, signature recognition, body weight, individual markings, and gait recognition.

28. The method of claim 25, the user credentials including geographical location of the programmable logic controller.

29. The method of claim 28, further comprising utilizing one or more of a Ground Positioning System (GPS) and Radio Frequency Identification (RFID) to determine the geographical location of the programmable logic controller.

30. The method of claim 25, further including building an ad hoc data network, comprising:
    determining whether hierarchically structured data is received;
    based on the determination, setting a software timer;
    polling one or more adjacent programmable logic controllers;
    ascertaining whether the one or more adjacent programmable logic controllers generated a response to the polling;
    reconstructing information from the one or more responding programmable logic controllers; and
    utilizing a machine learning and reasoning component nominate one of the one or more responding programmable logic controllers to be a master.

31. The method of claim 25, further including disengaging from an ad hoc data network, comprising:
    ascertaining whether a master programmable logic controller is in independent mode;
    determining whether the master programmable logic controller has received hierarchically structured data from one or more external data source;
    establishing whether one or more adjacent programmable logic controllers are receiving hierarchically structured data from the one or more external data source;
    based on the establishing, stopping a hardware timer; and
    disengaging the one or more adjacent programmable logic controllers from accessing the master programmable logic controller.

32. A programmable logic controller, comprising:
    an interface component that transmits hierarchically structured data in response to a user request; and
    a filter component that filters the data transmitted by the interface component based at least in part on at least one filtering parameter, the interface component, the filter component and the programmable logic controller integrated to form a single indivisible unit, the filter component utilizes a machine learning and reasoning component in conjunction with the at least one filtering parameter to produce a subset of an entirety of the hierarchically structured data in response to the user request.

33. The programmable logic controller of claim 32, the data transmitted by the interface component comprises a subset of a totality of the hierarchically structured data.

34. A controller, comprising:
    means for receiving data structured hierarchically;
    means for fractionating the data structured hierarchically based on one or more filtering parameter into one or more fractionated datum using a machine reasoning and learning approach; and
    means for displaying the one or more fractionated datum.

35. The controller of claim 34, the filtering parameters include one or more factory presets, biometric information, passwords, group affiliations and geographical information.

36. The controller of claim 34, further including creating an ad hoc network during network failure, further comprising:
    means for determining whether hierarchically structured data is received;
    means for setting a timer based on the determination made whether hierarchically structured data is received;
    means for polling one or more adjacent controllers;
    means for determining whether one of the adjacent controllers responds to the poll;
    means for at least one of entering standalone mode or reconstructing information based on the response to the poll of the one or more adjacent controllers; and
    means for nominating a master controller when information is reconstructed.

37. The controller of claim 34, the means for fractionating data further comprising:
    means for fractionating the data structured hierarchically based on at least one of factory presets, biometric information, passwords, group affiliations and geographical information; and
    means for displaying a customized view based on the one or more fractionated datum.

* * * * *